No. 696,018. Patented Mar. 25, 1902.
B. EDGAR.
FISH HOOK.
(Application filed Aug. 9, 1901.)
(No Model.)
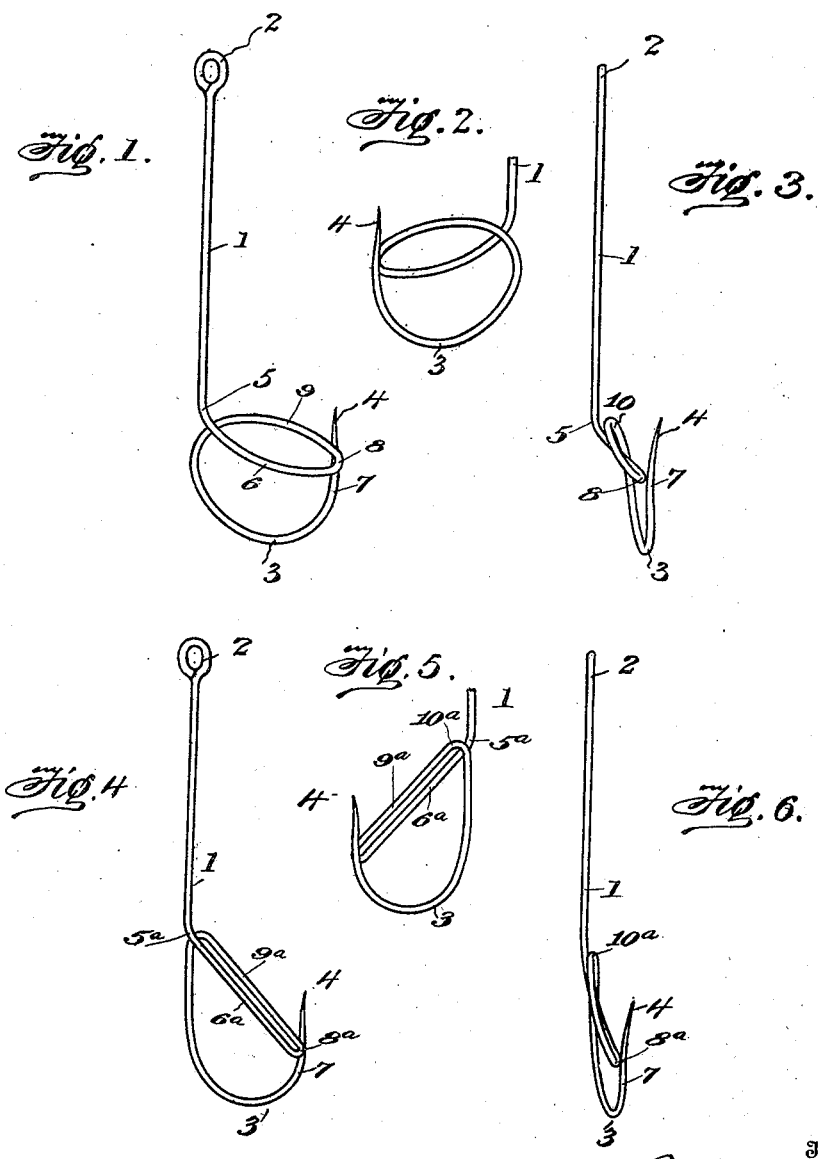
Witnesses
Fenton S. Belt,
C. W. Clement,
Inventor
Butler Edgar
By Watson & Watson
Attorneys

UNITED STATES PATENT OFFICE.

BUTLER EDGAR, OF DANVILLE, PENNSYLVANIA.

FISH-HOOK.

SPECIFICATION forming part of Letters Patent No. 696,018, dated March 25, 1902.

Application filed August 9, 1901. Serial No. 71,506. (No model.)

*To all whom it may concern:*

Be it known that I, BUTLER EDGAR, a citizen of the United States, residing at Danville, in the county of Montour, State of Pennsylvania, have invented certain new and useful Improvements in Fish-Hooks, of which the following is a specification.

This invention relates to improvements in fish-hooks, whereby a hook may be made of a single piece of wire having a guard to prevent the fish from getting off the hook, said guard also serving as a means for retaining the bait upon the hook.

In the accompanying drawings, which illustrate my invention, Figure 1 is a side view of one of my improved hooks. Fig. 2 is a view of the hook portion and guard taken from the opposite side. Fig. 3 is a front view of the hook. Fig. 4 is a side view of a hook having a differently-formed guard. Fig. 5 is a view showing the hook portion and guard taken from the opposite side, and Fig. 6 is a front view of the hook shown in Fig. 4.

The hook in the views shown in the drawings consists of a single piece of wire having a shank 1, an eye 2 at the upper end of the shank, a hook portion 3, having a pointed end or spear 4, and a guard closing the hook, said guard consisting of a return-bend in the wire formed between the shank and hook portion.

In the hook shown in Figs. 1, 2, and 3 the wire is bent forwardly and to the right at the lower end 5 of the shank, and thence curves forwardly, forming the lower arm 6 of the guard, the forward end of which rests against the side of the upwardly-turned portion 7 of the hook. At said forward end the wire is bent upwardly and to the left, as shown at 8, and thence extends rearwardly, forming the curved arm 9, which extends over the lower arm at its rear end, as shown at 10, and extends downwardly to form the hook portion 3. The pointed end 4 of the hook, which is arranged at one side of the shank, projects above the guard and is not provided with a barb. In this form of hook, in which the guard forms an open loop, some kinds of bait, such as worms and soft bait, may be held upon the hook by simply twisting the body of the bait around the arms of the guard and through the loop and the space below the loop. This affords a means of securely holding some forms of live bait without the necessity of piercing it with the hook, and the guard prevents the fish from becoming unhooked. As the lower arm 6 of the loop comes beneath the upper arm at the juncture of the shank and hook portion, the stress upon the hook portion is transmitted to the shank at the point where said arms cross. Hence the hook is strengthened by the guard, and the hook may in consequence be made of comparatively fine wire.

In Figs. 4, 5, and 6 the construction is very much the same, the chief difference being in the form of the arms $6^a$ and $9^a$, which are not curved to form a wide loop, as are the arms in the previously-described figures. In Figs. 4, 5, and 6 also the guard is arranged at a somewhat greater angle to the shank; but this is an immaterial feature. The arm $6^a$ is straight or nearly so and is bent forwardly and to the right at the point $5^a$. At the forward bend $8^a$, where the guard meets the upward projection 7 of the hook, the wire is doubled backwardly upon itself and slightly to the left, as shown at $8^a$, and the arm $9^a$ extends over the arm $6^a$ to the point $10^a$, where it is bent downwardly over said latter arm to form the hook portion. In this hook also the stress upon the hook portion is taken up by the shank at the rear end of the guard where the guard-arms cross.

The two arms of the guard may be arranged parallel with each other and close together, or they may be separate and bent into any desired form for the purpose of holding the bait. I do not therefore wish to limit myself to any particular shape of the guard-arms.

Having thus fully described my invention, what I claim as new, and desire to secure by Letters Patent, is—

1. As a new article of manufacture, a fish-hook constructed of a single piece of wire having a shank, a hook portion and a guard, said guard consisting of a return-bend in the wire formed between the shank and hook portion and extending across the latter.

2. As a new article of manufacture, a fish-hook constructed of a single piece of wire having a shank, a hook portion and a guard, said guard extending forwardly from the lower end of the shank to the upward extension of the hook, forming a lower arm, thence upwardly and rearwardly above and at one side of said lower arm, and thence downwardly at the opposite side of said arm to the hook portion.

3. As a new article of manufacture, a fishhook constructed of a single piece of wire having a shank, a hook portion and guard, said guard extending forwardly from the lower end of the shank to the upper extension of the hook, forming a lower arm, thence upwardly and rearwardly above and at one side of the lower arm, forming an upper arm, and thence downwardly at the opposite side of said lower arm to the hook portion, said arms being separate from one another to form a loop.

In testimony whereof I affix my signature in presence of two witnesses.

BUTLER EDGAR.

Witnesses:
JOHN W. FARNSWORTH.
CHAS. N. MORTIMER.